United States Patent
Lee et al.

(10) Patent No.: US 7,538,822 B2
(45) Date of Patent: May 26, 2009

(54) APPARATUS AND METHOD FOR FILTERING DIGITAL IMAGE SIGNAL

(75) Inventors: Hoyoung Lee, Suwon-Si (KR);
Vladimar Kim, Suwon-Si (KR);
Changyeong Kim, Yongin-si (KR);
Dusik Park, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 815 days.

(21) Appl. No.: 11/046,696

(22) Filed: Feb. 1, 2005

(65) Prior Publication Data

US 2005/0248687 A1 Nov. 10, 2005

(30) Foreign Application Priority Data

May 4, 2004 (KR) .................. 10-2004-0031319

(51) Int. Cl.
*H04N 5/217* (2006.01)
*H04N 5/21* (2006.01)

(52) U.S. Cl. .................. 348/606; 348/607; 348/622; 348/625

(58) Field of Classification Search ......... 348/606–607, 348/620, 622–625, 627–630, 241–242, 252–253, 348/533, 615, 699–700, 618; 382/260–261, 382/107, 263–264
See application file for complete search history.

(56) References Cited

U.S. PATENT DOCUMENTS

| 5,757,977 | A | * | 5/1998 | Mancuso et al. ............ 382/260 |
| 5,903,680 | A | * | 5/1999 | De Haan et al. ............ 382/265 |
| 6,037,986 | A | | 3/2000 | Zhang et al. |
| 6,067,125 | A | | 5/2000 | May |
| 6,281,942 | B1 | | 8/2001 | Wang |
| 6,335,990 | B1 | | 1/2002 | Chen et al. |
| 7,009,662 | B2 | * | 3/2006 | Ojo et al. ................... 348/625 |
| 7,130,481 | B2 | * | 10/2006 | Yu ........................... 382/261 |
| 7,145,607 | B1 | * | 12/2006 | Hui ......................... 348/607 |
| 2001/0007478 | A1 | | 7/2001 | Kim |

FOREIGN PATENT DOCUMENTS

| KR | P1999-61827 | 7/1999 |
| KR | 2004-30096 | 4/2004 |
| WO | 97/39572 | 10/1997 |
| WO | WO 01/35677 | 5/2001 |

OTHER PUBLICATIONS

Notice to Submit Response issued by the Korean Industrial Property Office on Nov. 16, 2005 in Application No. 10-2004-31319.

(Continued)

*Primary Examiner*—Trang U Tran
(74) *Attorney, Agent, or Firm*—Staas & Halsey LLP

(57) ABSTRACT

An apparatus and method of filtering a digital image signal. The apparatus includes: a noise reduction filter which selectively outputs one of results obtained by temporally and spatially filtering pixel values of pixels of each of frames of an image as a temporal or spatial filtering value in response to magnitudes of the results of temporal and spatial filtering; and a sharpness enhancement filter which highlights and outputs a high pass component of the temporal or spatial filtering value.

18 Claims, 10 Drawing Sheets

OTHER PUBLICATIONS

Partial European Search Report Communication issued by the European Patent Office on Jun. 1, 2007 in Application No. 04256196.9-1522 (6 pages).

James C. Brailean, Richard P. Kleihorst, Serafim Efstratiadis, Aggelos K. Katsaggelos and Reginald L. Lagendijk, "*Noise Reduction Filters for Dynamic Image Sequences: A Review*", Proceedings of the IEEE, vol. 83, No. 9, Sep. 1995, pp. 1272-1292.

Shinri Inamori Satoru Yamachi, Kohji Fukuhara, "*A Method of Noise Reduction on Image Processing*", IEEE, Mar. 1993, pp. 332-333.

Li Yan, "*Noise Reduction for MPEG Type of CODEC*", IEEE, 1994, pp. V-429-432.

Albert van der Werf, Fons Brüls, Richard P. Kleihorst, Erwin Waterlander, Math J. W. Verstraelen and Thomas Friedrich, "*McIC: A Single-Chip MPEG-2 Video Encloder for Storage*", IEEE Journal of Solid-State Circuits, vol. 32, No. 11, Nov. 1997, pp. 1817-1823.

Image Analysis and Computer Vision, Chapter 9, Section 9.4, "*Edge Detection*", pp. 347-349.

Eric Dubois and Shaker Sabri, "*Noise Reduction in Image Sequences Using Motion-Compensated Temporal Filtering*", IEEE Transactions on Communications, vol. Com-32, No. 7, Jul. 1984, pp. 826-831.

Zlokolica V., et al., "Motion and Detail Adaptive Denoising of Video", Proceedings of the SPIE—The Int'l Society for Optical Engineering SPIE-Int., Soc. Opt. Eng. USA, vol. 5298, No. 1, Jan. 19, 2004, pp. 403-412.

Seto T., et al., "Selective Sharpness Enhancement of Heavily Corrupted Old Film Sequences", Image Processing, 2000., Int'l Conference on Sep. 10-13, 2000; Piscataway, NJ, USA; IEEE, vol. 2, pp. 676-679, XP010530075; ISBN: 0-7803;6297-7 (Section 4; Abstract).

European Search Report issued by the European Patent Office on Aug. 8, 2007 in Application No. 04256196.9—1522 (8 pages).

Haan de G., et al., "Television Noise Reduction IC", IEEE Transactions on Consumer Electronics, IEEE Service Center, New York, NY, US, vol. 44, No. 1, Feb. 1998, pp. 143-154, XP000779261; ISSN: 0098-3063.

Jaspers, Egbert G.T., et al., "A Generic 2D Sharpness Enhancement Algorithm for Luminance Signals", Image Processing and Its Applications, 1997, Sixth International Conference on Dublin, Ireland Jul. 14-17, 1997; London, UK, IEE, UK, vol. 1, pp. 269-273, XP006508295; ISBN: 0-85296-692-X (Abstract).

Polesel, A., et al., "Adaptive Unsharp Masking for Contrast Enhancement", Image Processing, 1997. Proceedings, International Conference on Santa Barbara, CA, USA, Oct. 26-29, 1997; IEEE Comput. Soc., US, vol. 1, pp. 267-270, XP010254160; ISBN:0-8186-8183-7; section 2.

* cited by examiner

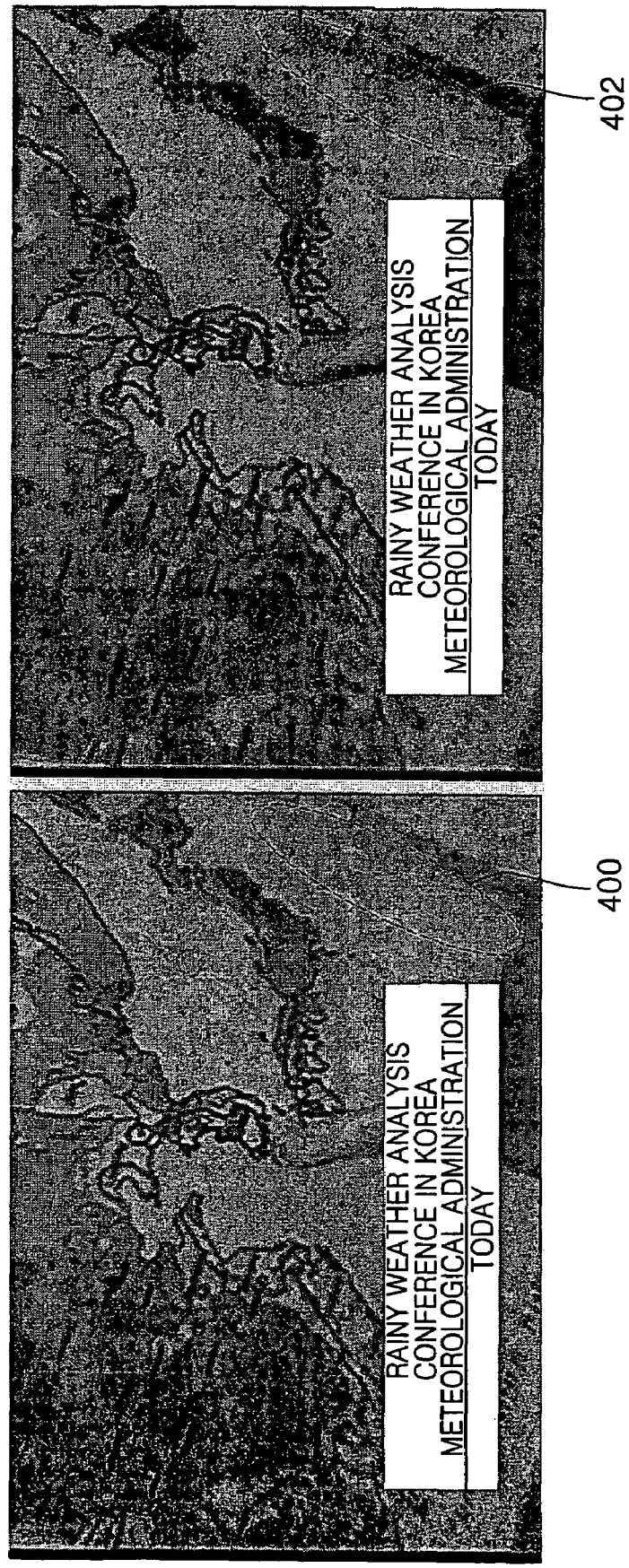

APPARATUS AND METHOD FOR FILTERING DIGITAL IMAGE SIGNAL

CROSS-REFERENCE TO RELATED APPLICATIONS

This application claims the priority of Korean Patent Application No. 2004-31319, filed on May 4, 2004 in the Korean Intellectual Property Office, the disclosure of which is incorporated herein in its entirety by reference.

BACKGROUND OF THE INVENTION

1. Field of the Invention

The present invention relates to an image processing device such as a digital television (DTV), a multi-function monitor, or a display system on chip (SoC), and more particularly, to an apparatus and method of filtering a digital image signal.

2. Description of the Related Art

In general, a transmitter transmits a digital image signal which necessarily includes a noise component due to the characteristics of a transmission channel or a display device. A receiver may improve such a noise component using a signal processing technique.

Most of the conventional methods of filtering a digital image signal to reduce noise using a signal processing technique adopt 2-dimensional spatial filtering or 1-dimensional temporal filtering. In addition, there have recently been suggested techniques for using motion compensation to exactly extract inter-field correlation information from a moving image sequence. However, in such a conventional digital image signal filtering method, a noise component deteriorates the accuracy of motion estimation. Also, such motion estimation includes complicated operations and increases the complexity of hardware.

Moreover, an image, which has passed through a noise reduction filter, is generally less sharp than the input image. This results from the characteristics of a low-pass filter (LPF) of the general noise reduction filter. Thus, most conventional digital image signal filtering methods perform noise reduction filtering and then adopt a sharpness enhancement filter, which enhances a high pass component, so as to prevent the deterioration of the sharpness of an image.

Conventional methods using spatial filtering are disclosed in a paper entitled "Noise Reduction for MPEG type of Code" by L. Yan, 1994 and published in IEEE International Conference Acoustic, Speech and Signal Processing, a paper entitled "I.McIC:a Single-chip MPEG-2 Video Encoder for Storage" by A. van der Werf, November, 1997 and published in IEEE Journal of Solid-State Circuits, vol. 32, No. 11, and European Patent No. EP0878776 by Mancuso et al. published on Aug. 27, 2003. The conventional spatial filtering method disclosed in European Patent No. EP0878776 determines whether a pixel to be filtered is a smooth pixel using a fuzzy logic process so as to adaptively employ low-pass filtering. However, such a conventional spatial filtering method deteriorates filtering performance when a noise level is high.

Also, a conventional method using motion compensation is disclosed in a paper entitled "Noise Reduction Filters for Dynamic Image Sequences: a Review" by Katsaggelos, September 1996 and published in Processings of IEEE, vol. 83. The disclosed method requires a large amount of operations to be executed due to excessively repeated operations and thus is costly and has difficulty in real-time realization.

A conventional method using temporal filtering is disclosed in a paper entitled "Noise Reduction in Image Sequences Using Motion Compensated Temporal Filtering" by E. Dubois et al., July 1984 and published in IEEE Trans. On Communications, vol. COM-32, p 826-831. In the disclosed method, an image is roughly divided based on a distance between a central pixel and a neighboring pixel in order to prevent pixels included in different regions in a window from being filtered. Only a minimal amount of blurring occurs at the edge of an image, in a method using temporal filtering, compared to a spatial filtering method. However, the deterioration of image quality by artifacts such as ghost tail occurs with an increase in the number of frames used for filtering.

A conventional temporal filtering method, which is an improvement of Dubois technique, is disclosed in a paper entitled "A Method of Noise Reduction on Image Processing" by S. Inamori et al., November, 1993 and published in IEEE Trans. on Consumer Electorinics, vol. 39, No. 4. In the disclosed method, a filtering function is turned on or off through motion detection and edge detection to prevent a ghost tail from occurring. However, the ghost tail still occurs and particularly, the filtering function is turned off even when a noise peak appears.

Furthermore, the previously-described conventional methods mostly reduce noise using a low-pass filtering technique. As a result, the sharpness of a filtered result deteriorates.

SUMMARY OF THE INVENTION

In accordance with an aspect of the present invention an apparatus to filter a digital image signal to efficiently and economically reduce noise and to improve the sharpness of an image is provided.

In accordance with an aspect of the present invention, a method of filtering a digital image signal to efficiently and economically reduce noise and to improve the sharpness of an image is provided.

According to an aspect of the present invention, there is provided an apparatus to filter a digital image signal, including: a noise reduction filter which selectively outputs one of results obtained by temporally or spatially filtering pixel values of pixels of each frame of an image as a temporal or spatial filtering value in response to magnitudes of the results of the temporal or spatial filtering; and a sharpness enhancement filter which highlights and outputs a high pass component of the temporal or spatial filtering value.

According to another aspect of the present invention, there is provided a method of filtering a digital image signal, including: selectively determining one of results obtained by temporally and spatially filtering pixel values of pixels of each of frames of an image as a temporal or spatial filtering value in response to magnitudes of the results of temporal and spatial filtering; and highlighting a high pass component of the temporal or spatial filtering value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 17A and 17B are views comparing embodiments of the present invention with the conventional filtering.

DETAILED DESCRIPTION OF THE PREFERRED EMBODIMENTS

Figure 1:
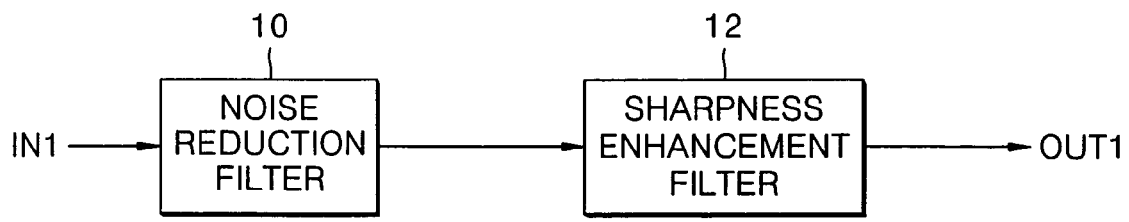
FIG. 1 is a block diagram of an apparatus filtering a digital image signal, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus filtering a digital image signal, according to an embodiment of the present invention. Referring to FIG. 1, the apparatus includes a noise reduction filter 10 and a sharpness enhancement filter 12.

Figure 2:
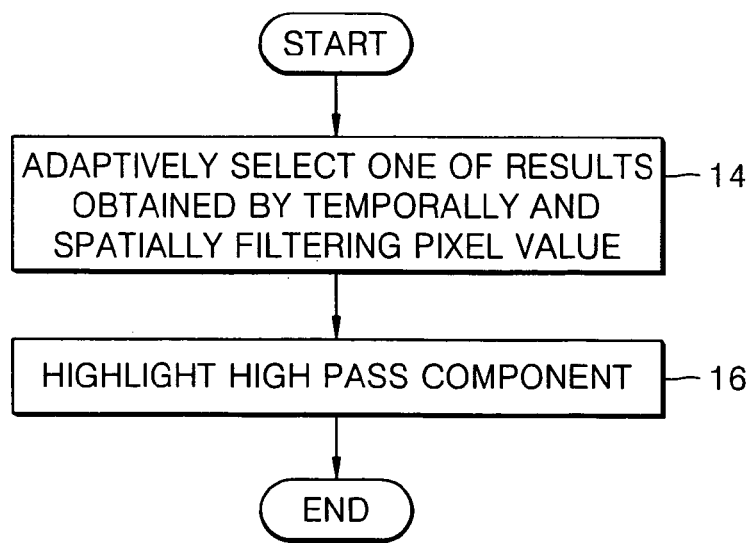
FIG. 2 is a flowchart explaining a method of filtering a digital image signal, according to an embodiment of the present invention.

FIG. 2 is a flowchart explaining a method of filtering a digital image signal, according to an embodiment of the present invention. Referring to FIG. 2, the method includes in operation 14 selecting one of the results, which are obtained by temporally and spatially filtering pixel values, and operation 16 highlighting a high pass component of the selection result.

In operation 14, the noise reduction filter 10 of FIG. 1 selects one of the results of temporal and spatial filtering for pixel values of each frame of an image received via an input node IN1 according to magnitudes of the results, and then the selected result is transferred to the sharpness enhancement filter 12 which highlights the high pass component in operation 16.

Figure 3:
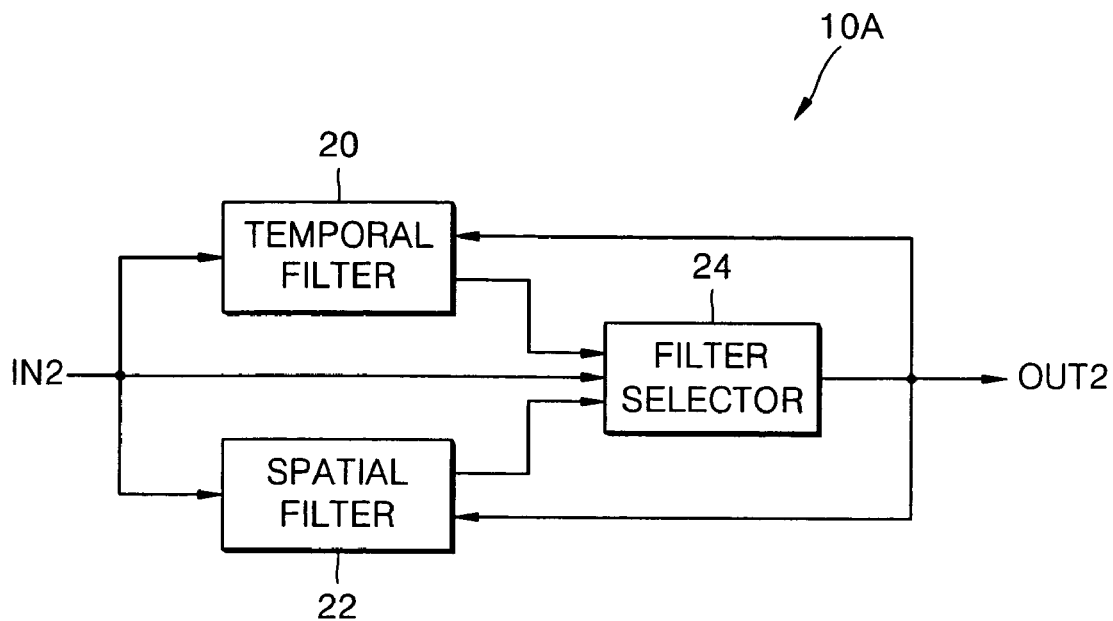
FIG. 3 is a block diagram of an embodiment of the present invention of the noise reduction filter of FIG. 1.

FIG. 3 is a block diagram of an embodiment 10A of the present invention of the noise reduction filter 10 of FIG. 1, including a temporal filter 20, a spatial filter 22, and a filter selector 24.

The temporal filter 20 of FIG. 3 temporally filters pixel values input via an input node IN2 and outputs the results of the temporal filtering to the filter selector 24.

The spatial filter 22 spatially filters the pixel values input via the input node IN2 and outputs the results of the spatial filtering to the filter selector 24.

The filter selector 24 compares each magnitude of the results of the temporal and spatial filtering input, respectively, from the temporal and spatial filters 20 and 22 with a local spatial mean value. The filter selector 24 selects one of the results of the temporal and spatial filtering as a temporal or spatial filtering value, which is as a final result of noise filtering, in response to the comparison result, and outputs the selection result via an output node OUT2. For example, the filter selector 24 can select the temporal or spatial filtering value using Equation 1:

$$\hat{f}_s(\vec{x}, t) = \begin{cases} \hat{f}(\vec{x}, t), & \text{if } |f_\sigma(\vec{x}, t) - \bar{f}(\vec{x}, t)| > |\hat{f}(\vec{x}, t) - \bar{f}(\vec{x}, t)| \\ f_\sigma(\vec{x}, t), & \text{else} \end{cases} \quad (1)$$

wherein "| |" denotes an absolute value, "$\vec{x}$" denotes a 2-dimensional spatial position vector of a pixel, "$\hat{f}_s(\vec{x}, t)$" denotes the result of the noise reduction filter 10A, "$\hat{f}(\vec{x}, t)$" denotes the result of temporal filtering of the pixel value, "$f_o(\vec{x}, t)$" denotes the result of spatial filtering of the pixel value, and "$\bar{f}(\vec{x}, t)$" denotes the local spatial mean value. The local spatial mean value refers to a mean pixel value of a local region including a central pixel which is an object of interest in a current frame input via the input node IN2.

Figure 4:
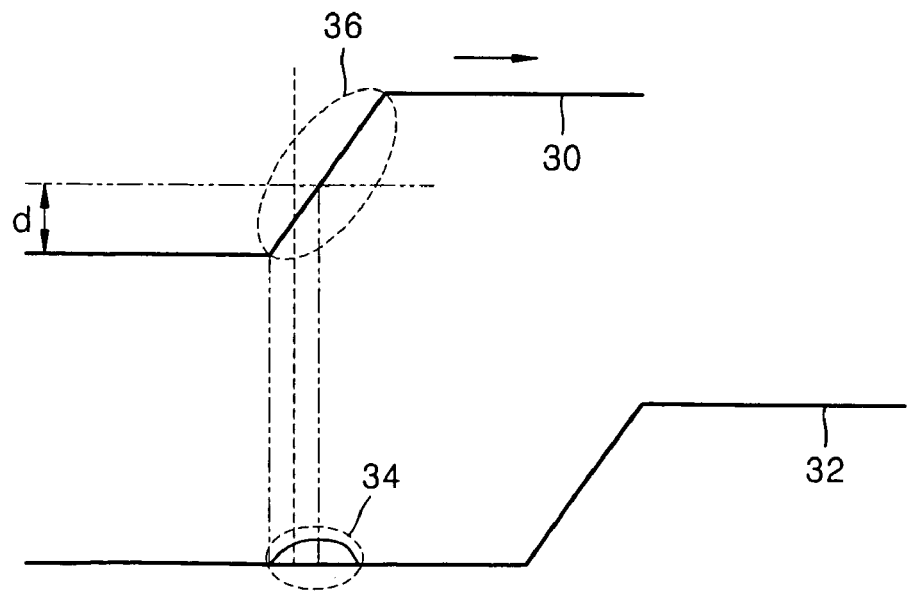
FIG. 4 is a view explaining an example of a ghost tail.

FIG. 4 is a view explaining an example of a ghost tail. Referring to FIG. 4, in a case of a conventional method only using temporal filtering, the quality of an image may deteriorate. The ghost tail 34 occurs when the edge of a slow varying slope 36 of a luminance value of a t−1$^{th}$ frame 30 overlaps with a t$^{th}$ frame 32. Since the fixed motion detection threshold is generally used, in a case where the variation of the luminance value is not abrupt but slowly varying, the ghost tail occurs and deteriorates the quality of image. However, in the apparatus and method of filtering the digital image signal, according to the embodiments of the present invention, when the results of the temporal filtering of the pixel values are larger than the local spatial mean value, a ghost tail artifact is highly likely to occur. Thus, the results of the spatial filtering of the pixel values are selected instead of the results of the temporal filtering of the pixel values as shown in Equation 1 above.

The structure and operation of an embodiment of the present invention of the temporal filter 20 of FIG. 3 will now be explained with reference to the attached drawings.

Figure 5:
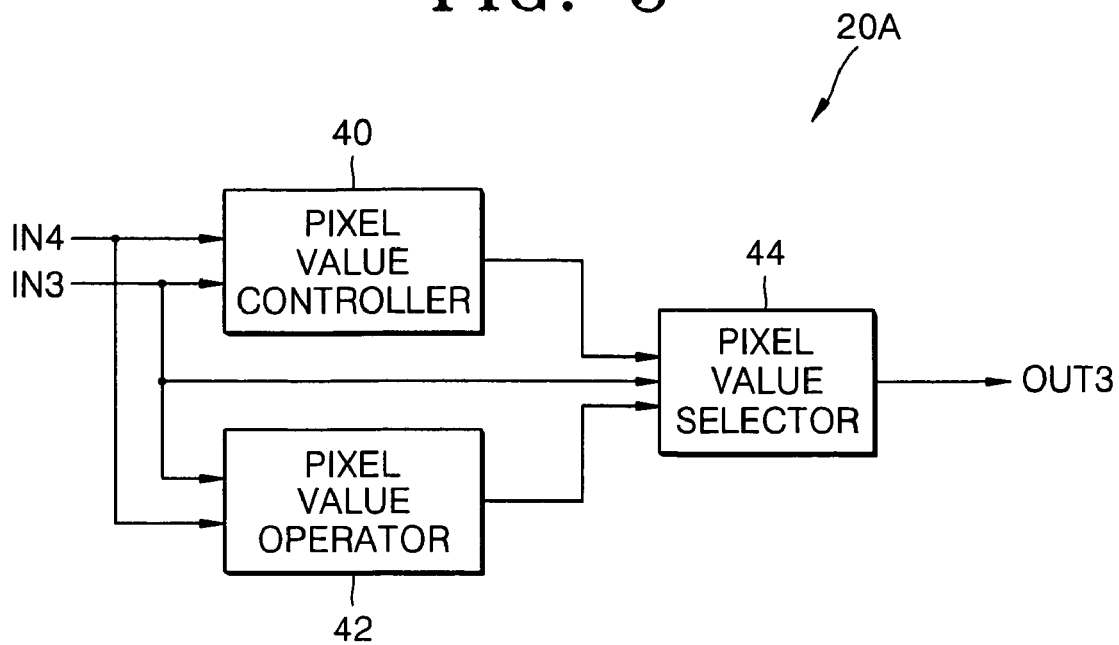
FIG. 5 is a block diagram of an embodiment 20A of the present invention of the temporal filter 20 of FIG. 3.

FIG. 5 is a block diagram of an embodiment 20A of the temporal filter 20 shown in FIG. 3, including a pixel value controller 40, a pixel value operator 42, and a pixel value selector 44.

According to an aspect of the present invention, the pixel value controller 40 subtracts a pixel value of a previous frame input via an input node IN4 from a pixel value of a current frame input via an input node IN3, compares the subtraction result with a motion detection threshold value, and outputs the comparison result as a pixel value control signal to the pixel value selector 44. Here, the pixel value operator 42 generates a new pixel value using the pixel values of the current and previous frames input via the input nodes IN3 and IN4 and outputs the new pixel value to the pixel value selector 44. The pixel value operator 42 may determine a mean of the pixel values of the current and previous frames input via the input nodes IN3 and IN4 and use the mean as the new pixel value. The pixel value selector 44 selects the pixel value of the current frame input via the input node IN3 or the new pixel value input from the pixel value operator 42 in response to the pixel value control signal received from the pixel value controller 40 and outputs the selection result via an output node OUT3. For example, if it is perceived through the pixel value control signal that the subtraction result is smaller than or equal to the motion detection threshold value, the pixel value selector 44 selects the new pixel value. If it is perceived through the pixel value control signal that the subtraction result is larger than the motion detection threshold value, the pixel value selector 44 selects the pixel value of the current frame. When the subtraction result is smaller than or equal to the motion detection threshold value motion of an object in the image occurs infrequently, while when the subtraction result is larger than the motion detection threshold value the motion of an object in the image occurs frequently. Thus, when the occurrence of the motion of the object is rare, a noise recognition degree of a human's vision is high. In this case, the temporal filter 20A selects and outputs the new pixel value from which noise has been reduced. When the occurrence of the motion of the object is frequent, the noise recognition degree of the human's vision is low. In this case, the temporal filter 20A selects and outputs the pixel value of the current frame. As a result, the occurrence of blurring is reduced.

According to another aspect of the present invention, the pixel value controller 40 subtracts the temporal or spatial filtering value of the previous frame, which is input from the filter selector 24 via the input node IN4, from the pixel value of the current frame input via the input node IN3, compares the subtraction result with the motion detection threshold value, and outputs the comparison result as the pixel value control signal to the pixel value selector 44. Here, the pixel value operator 42 adds a weight on the pixel value of the current frame input via the input node IN3 and the temporal or spatial filtering value of the previous frame input via the input node IN4 to generate at least one new pixel value and outputs the at least one new pixel value to the pixel value selector 44. The pixel value selector 44 selects the pixel value of the current frame input via the input node IN3 or the new pixel value input from the pixel value operator 42 in response to the pixel value control signal input from the pixel value controller 40 and outputs the selection result via the output node OUT3. For example, the temporal filter 20A can temporally filter pixel values using Equation 2:

$$\hat{f}(\vec{x},t) = \begin{cases} \frac{f(\vec{x},t) + 2 \times \hat{f}_s(\vec{x},t-1)}{3}, & \text{if } |f(\vec{x},t) - \hat{f}_s(\vec{x},t-1)| \le \frac{d}{2} \\ \frac{2 \times f(\vec{x},t) + \hat{f}_s(\vec{x},t-1)}{3}, & \text{if } \frac{d}{2} < |f(\vec{x},t) - \hat{f}_s(\vec{x},t-1)| \le d \\ f(\vec{x},t), & \text{else} \end{cases} \quad (2)$$

wherein "$f(\vec{x},t)$" denotes the pixel value of the current frame, "$\hat{f}_s(\vec{x},t-1)$" denotes the temporal or spatial filtering value of the previous frame, and d denotes the motion detection threshold value.

As can be seen in Equation 2, when a difference between the pixel value of the current frame and the temporal or spatial filtering value of the previous frame is low, more weight is added on the temporal or spatial filtering value of the previous frame to realize continuous image quality. When the difference between the pixel value of the current frame and the temporal or spatial filtering value of the previous frame is not low, more weight is added on the pixel value of the current frame.

The structure and operation of an embodiment of the present invention of the spatial filter 22 of FIG. 3 will now be described with reference to the attached drawings.

Figure 6:
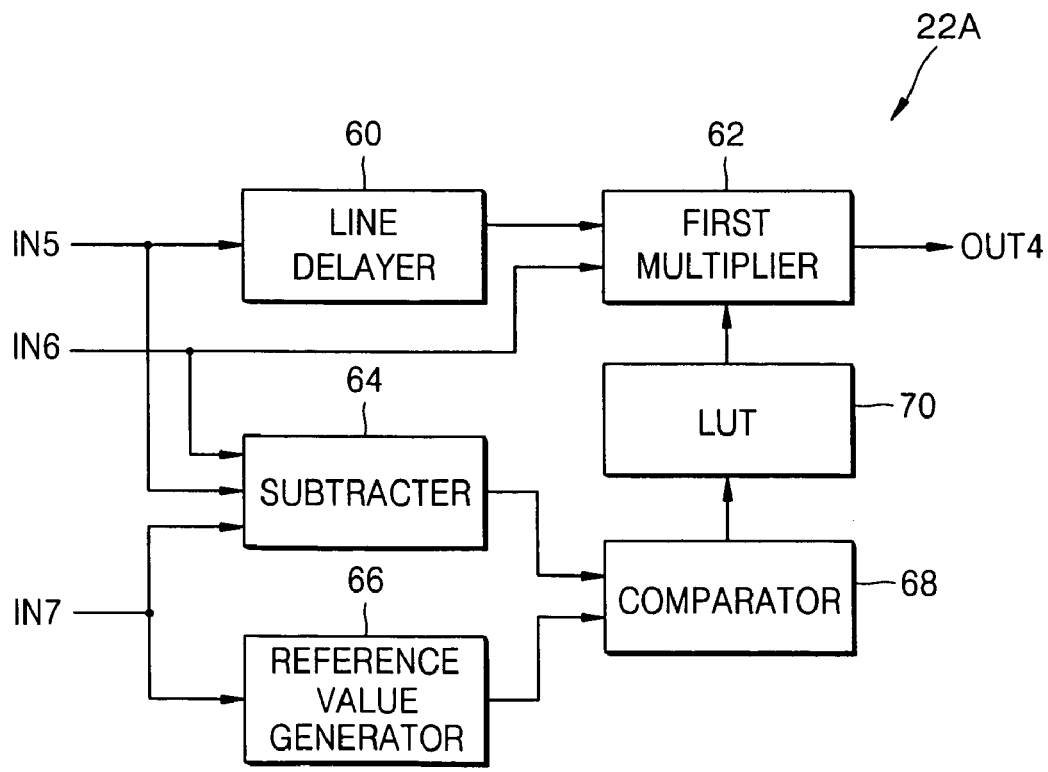
FIG. 6 is a block diagram of an embodiment 22A of the present invention of the spatial filter 22 of FIG. 3.

FIG. 6 is a block diagram of an embodiment 22A of the spatial filter 22 of FIG. 3, including a line delayer 60, a first multiplier 62, a subtracter 64, a reference value generator 66, a comparator 68, and a lookup table (LUT) 70.

According to an aspect of the present invention, the spatial filter 22A may include only the line delayer 60 and the first multiplier 62.

The line delayer 60 receives a temporal or spatial filtering value, which is generated for a neighboring pixel belonging to a previous line inside a window mask having a predetermined size, from the filter selector 24 via an input node IN5 to delay the received temporal or spatial filtering value by a unit line and outputs the delay result to the first multiplier 62. Here, the previous line refers to a line which is located prior to a current line, the current line refers to a line in which a central pixel is located, the central pixel refers to a pixel which is located in the center of the window mask, and the neighboring pixel refers to a pixel which neighbors the central pixel.

The first multiplier 62 multiplies pixel values of neighboring pixels belonging to a previous line input from the line delayer 60 among pixels inside the widow mask or pixel values of neighboring pixels belonging to a subsequent line input from an external source via an input node IN6 among pixels inside the window mask by corresponding weights, accumulates the multiplication results, and outputs the accumulation result as a result of spatial filtering of a pixel value of the central pixel via an output node OUT4. Here, the subsequent line refers to a line which is located after the current line. For example, the first multiplier 62 can obtain the result of spatial filtering of the pixel value of the central pixel using Equation 3:

$$f_O(\vec{x},t) = k \sum_{\vec{n} \in W} v(\vec{x},\vec{n}) \times f(\vec{x}+\vec{n},t) \quad (3)$$

wherein "$f_O(\vec{x},t)$" denotes the result of spatial filtering of the pixel value of the central pixel, k denotes a constant, "$v(\vec{x},\vec{n})$" denotes a weight, "$f(\vec{x}+\vec{n},t)$" denotes a pixel value of a neighboring pixel belonging to the previous or subsequent line, W denotes the window mask, and "$\vec{n}$" denotes a spatial position of a neighboring pixel inside the window mask.

Figure 7:
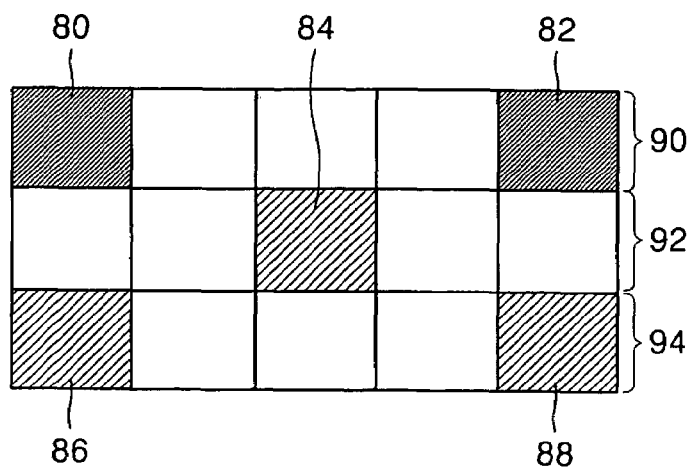
FIG. 7 is an exemplary view showing a 3×5 window mask to aid in the comprehension of the spatial filter 22A of FIG. 6.

FIG. 7 is an exemplary view of a 3×5 window mask to aid in the comprehension of the spatial filter 22A of FIG. 6, including a previous line 90, a current line 92, and a subsequent line 94.

The line delayer 60 of FIG. 6 receives temporal or spatial filtering values, which are generated for neighboring pixels 80 and 82 belonging to the previous line 90 inside the 3×5 window mask of FIG. 7, from the filter selector 24 via the input node IN5 to delay the received temporal or spatial filtering value by a unit line and outputs the delay result to the first multiplier 62.

The first multiplier 62 multiplies pixel values $f(\vec{x}+\vec{n},t)$ of the neighboring pixels 80 and 82 belonging to the previous line 90 input from the line delayer 60 among pixels inside the 3×5 window mask of FIG. 7 or pixel values $f(\vec{x}+\vec{n},t)$ of neighboring pixels 86 and 88 belonging to the subsequent line 94 input from the external source via the input node IN6 among pixels inside the 3×5 window mask by corresponding weights, accumulates the multiplication results, and outputs the accumulation result as a result of spatial filtering of a pixel value of a central pixel 84 via the output node OUT4.

As previously described, spatial filtering is performed using only five pixels 80, 82, 84, 86, and 88 of pixels inside the 3×5 window mask. The reason why all of the pixels inside the 3×5 window mask are not used is that the spatial filter 22A according to aspects of the present invention has a recursive structure in which temporal or spatial filtering values for the neighboring pixels 80 and 82 belonging to the previous line 90 are used to enhance noise reduction efficiency. As a result, since the pixel value of the central pixel 84 is spatially filtered using the recursive structure, oversmoothing can be minimized.

According to another aspect of the present invention, as shown in FIG. 6, in order to generate the weight, the spatial filter 22A may further include the subtracter 64, the reference value generator 66, the comparator 68, and the LUT 70.

Here, the subtracter 64 subtracts a pixel value of a neighboring pixel input via the input node IN5 or IN6 from a pixel value of a central pixel input via an input node IN7 and outputs the subtraction result to the comparator 68.

The reference value generator 66 predicts a noise variance value from the pixel value of the central pixel input via the input node IN7, generates a reference weight value using the predicted noise variance value, and outputs the reference weight value to the comparator 68.

Figure 8:
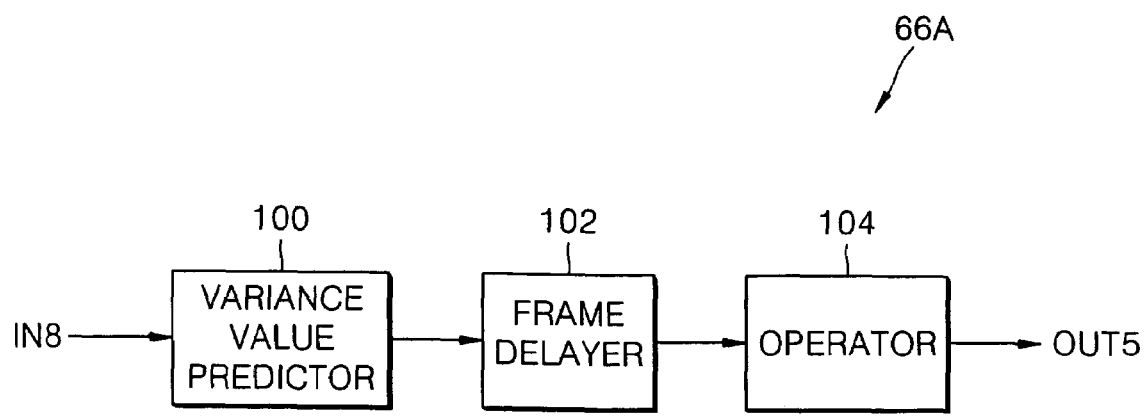
FIG. 8 is a block diagram of an embodiment 66A of the present invention of the reference value generator 66 of FIG. 6.

FIG. 8 is a block diagram of an embodiment 66A of the reference value generator 66 of FIG. 6, including a variance value predictor 100, a frame delayer 102, and an operator 104.

The variance value predictor 100 predicts a noise variance value from a pixel value of a central pixel input via an input node IN8 and outputs the predicted noise variance value to the frame delayer 102.

Figure 9:
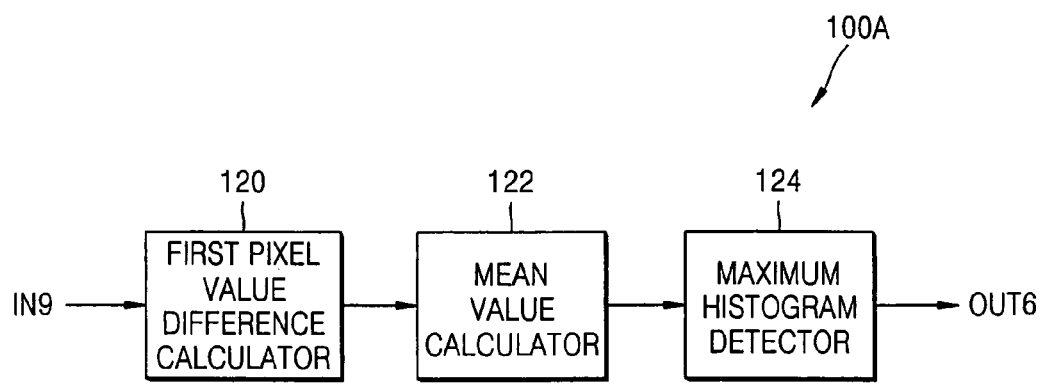
FIG. 9 is a block diagram of an embodiment 100A of the present invention of the variance value predictor 100 of FIG. 8.

FIG. 9 is a block diagram of an embodiment 100A of the variance value predictor 100 of FIG. 8, including a first pixel value difference calculator 120, a mean value calculator 122, and a maximum histogram detector 124.

The first pixel value difference calculator 120 calculates a difference between a pixel value of each of the pixels inside a window mask and a median pixel value and outputs the difference to the mean value calculator 122. For this purpose, the first pixel value difference calculator 120 may receive all the pixels inside the window mask via an input node IN9 and calculate the median pixel value from all the pixels. Here, the mean value calculator 122 calculates a mean value of the differences calculated by the first pixel value difference calculator 120 and outputs the mean value to the maximum histogram detector 124. For example, the mean value calculator 122 calculates the mean value using Equation 4:

$$S(\vec{x}) = \sum_{\vec{n} \in M \times N\, window} \frac{|in(\vec{n}) - \text{median}(\vec{n})|}{M \times N} \quad (4)$$

wherein "$S(\vec{x})$" denotes the mean value, M×N denotes the size of the window mask, "$in(\vec{n})$" denotes a pixel value of each of all the pixels inside the window mask, and "median($\vec{n}$)" denotes the median pixel value.

Here, the maximum histogram detector 124 receives the mean value from the mean value calculator 122, predicts a mean value having a maximum histogram from a noise variance value, and outputs the predicted noise variance value via an output node OUT6. For example, the maximum histogram detector 124 obtains the noise variance value using Equation 5:

$$N_{var} = \text{MAX}\{\text{Histogram}[S(\vec{x})]\} \quad (5)$$

wherein $N_{var}$ denotes the noise variance value, and MAX denotes a maximum value.

The frame delayer 102 of FIG. 8 delays the noise variance value predicted by the variance value predictor 100 by a unit frame and outputs the delayed noise variance value to the operator 104. The operator 104 generates a reference weight value using the delay result of the frame delayer 102 and outputs the reference weight value to the comparator 68 via an output node OUT5. The operator 104 generates the reference weight value using Equation 6:

$$\sigma = \frac{\sigma_{in}}{10} \times N_{var} + 0.5 \quad (6)$$

wherein σ denotes the reference weight value, and $\sigma_{in}$ denotes a predetermined initial value.

The comparator 68 compares the subtraction result of the subtracter 64 with the reference weight value generated by the reference value generator 66 and outputs the comparison result to the LUT 70. The LUT 70 receives as an address the comparison result from the comparator 68, stores the weight as data, and outputs data corresponding to the address input from the comparator 68 to the first multiplier 62.

For example, the subtracter 64, the reference value generator 66, the comparator 68, and the LUT 70 of FIG. 6 generate the weight using Equation 7:

$$v(|f(\vec{x},t) - f(\vec{x}+\vec{n},t)|) = v(a) = \begin{cases} 1, & a \leq \sigma \\ 0.25, & \sigma < a \leq 3\sigma \\ 0, & a > 3\sigma \end{cases} \quad (7)$$

wherein a denotes the subtraction result of the subtracter 64.

As shown in Equation 7, as the result a of the subtraction of a pixel value of a neighboring pixel from a pixel value of a central pixel is low, the correlation between the central pixel and the neighboring pixel is highly likely to be high. Thus, the weight [v(a)] is generated to be high.

Accordingly, the reference weight value a most greatly affects the filtering results of the spatial filter 22A. In other words, when the noise variance value is large, the reference weight value is set to be large so as to enhance noise removal efficiency. When the noise variance value is not large, the reference weight value is lowered to prevent blurring. For this purpose, a noise variance value is predicted for data in a previous frame to adaptively vary a predetermined initial value $\sigma_{in}$ according to the noise degree of the previous frame as in Equation 6. Here, a noise variance value of a current frame must be predicted to maximize noise reduction efficiency. However, when the noise variance value of the current frame is predicted, one frame delay necessarily occurs at an output node and one additional frame memory is required to store data in the current frame. Thus, on the assumption that a noise component is stationary, the noise variance value predicted for data in the previous frame may be used for reducing noise of the current frame.

In FIG. 2, after operation 14, in operation 16, the sharpness enhancement filter 12 of FIG. 1 highlights a high pass component of the temporal or spatial filtering value input from the noise reduction filter 10 and outputs the highlighted result via an output node OUT1.

Here, the temporal or spatial filtering value output from the noise reduction filter 10 may be in the form of red (R), green (G), and blue (B). In this case, for color balancing at a gray edge, the sharpness enhancement filter 12 may transform the temporal or spatial filtering value in the form of RGB into a color space of YCbCr (where Y denotes a luminance component, and CbCr denote chrominance components, respectively) and highlight the high pass component using only the transformed luminance component Y. Here, while the high pass component is highlighted for the luminance component Y, the chrominance components CbCr are delayed. Thereafter, the highlighted result of the high pass component for the luminance component Y and the delayed chrominance components CbCr are recovered to the RGB form. For example, the sharpness enhancement filter 12 may include a transformer (not shown) which transforms the RGB form into the color space of YCbCr, a delayer (not shown) which delays the chrominance components CbCr, and a recovery unit (not shown) which recovers the color space of YCbCr to the RGB form. However, the transformer, the delayer, and the recovery unit may be separately installed outside the sharpness enhancement filter 12.

Figure 10:
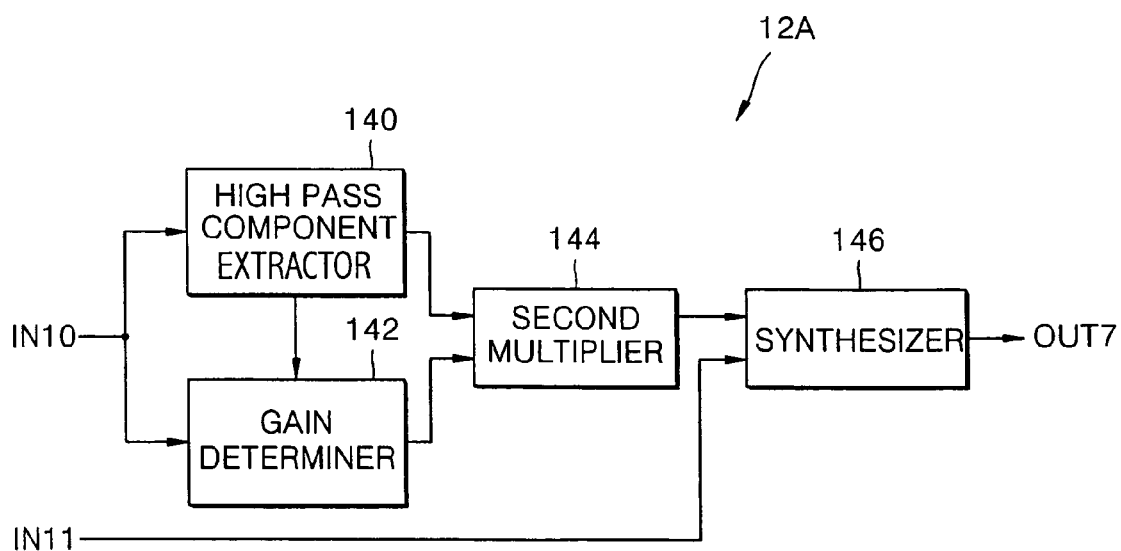
FIG. 10 is a block diagram of an embodiment 12A of the present invention of the sharpness enhancement filter 12 of FIG. 1.

FIG. 10 is a block diagram of an embodiment 12A of the sharpness enhancement filter 12 of FIG. 1, including a high pass component extractor 140, a gain determiner 142, a second multiplier 144, and a synthesizer 146.

The high pass component extractor 140 of FIG. 10 receives a temporal or spatial filtering value for a central pixel via an input node IN10, extracts a high pass component of the temporal or spatial filtering value, and outputs the high pass component to the second multiplier 144.

Figure 11:
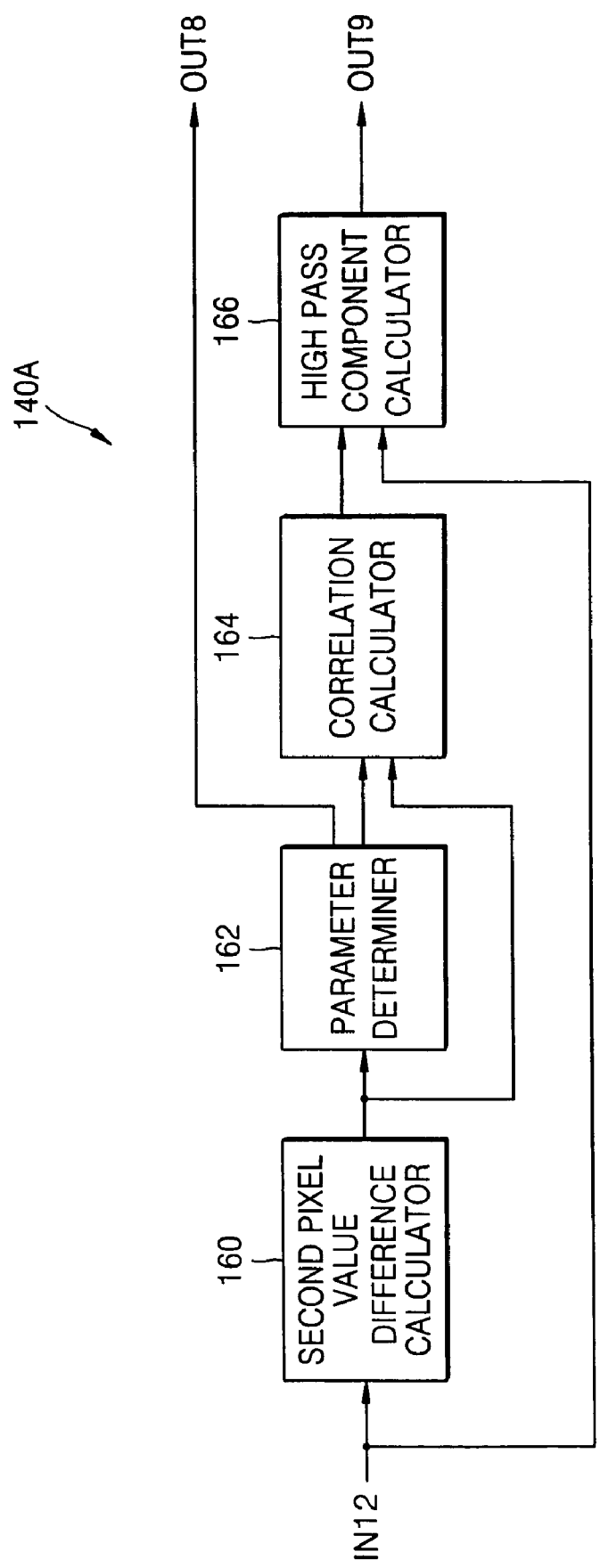
FIG. 11 is a block diagram of an embodiment 140A of the present invention of the high pass component extractor 140 of FIG. 10.

FIG. 11 is a block diagram of an embodiment 140A of the high pass component extractor 140 of FIG. 10, including a second pixel value difference calculator 160, a parameter determiner 162, a correlation calculator 164, and a high pass component calculator 166.

The second pixel value difference calculator 160 of FIG. 11 receives a pixel value of a central pixel and a pixel value of a neighboring pixel via an input node IN12, calculates a difference between the pixel values of the central and neighboring pixels, and outputs the difference to the parameter determiner 162 and the correlation calculator 164. Here, the neighboring pixel refers to a pixel which neighbors the central pixel.

Here, the parameter determiner 162 receives the difference from the second pixel value difference calculator 160, calculates a variation range of the difference, determines a parameter corresponding to the variation range of the difference, and outputs the parameter to the correlation calculator 164.

Here, the parameter determiner 162 outputs the variation range of the difference via an output node OUT8. For example, the parameter determiner 162 determines the parameter using Equation 8:

$$\Delta = \begin{cases} \text{High,} & \text{if } D_{range} \leq th_1 \\ \text{Low,} & \text{if } D_{range} > th_1 \end{cases} \quad (8)$$

wherein $\Delta$ denotes the parameter determined by the parameter determiner 162, $th_1$ denotes a first predetermined threshold value, and $D_{range}$ denotes the variation range of the difference which can be expressed as in Equation 9:

$$D_{range} = \text{MAX}\{D(m,n)\} - \text{MIN}\{D(m,n)\} \quad (9)$$

wherein, when a filter mask has the size of M'×N', $1 \leq m \leq M'$ and $1 \leq n \leq N'$, and D(m,n) denotes the difference calculated by the second pixel value difference calculator 160 which can be represented as in Equation 10:

$$D(m,n) = |z(m,n) - z(i,j)| \quad (10)$$

wherein z(m,n) denotes the pixel value of the central pixel, and z(i,j) denotes the pixel value of the neighboring pixel.

The correlation calculator 164 calculates a correlation between the central and neighboring pixels using the parameter input from the parameter determiner 162 and the difference input from the second pixel value difference calculator 160 and outputs the correlation to the high pass component calculator 166. For example, the correlation calculator 14 calculates the correlation using Equation 11:

$$W_{corr}(m, n) = \exp\left(-\frac{D(m, n)^2}{\Delta^2}\right) \quad (11)$$

wherein $W_{corr}(m,n)$ denotes the correlation.

Figure 12:
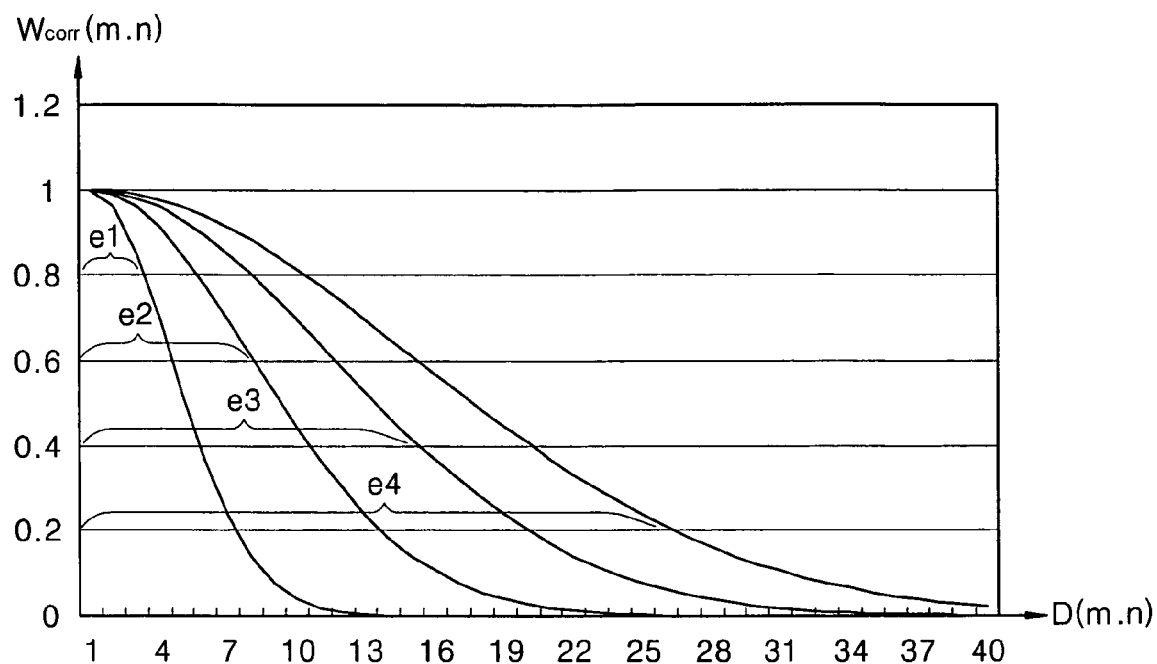
FIG. 12 is a graph showing the relationship between a parameter and a correlation.

FIG. 12 is a graph showing the relationship between the parameter and the correlation. Here, the vertical axis denotes the correlation $W_{corr}(m,n)$ and the horizontal axis denotes the difference D(m,n) calculated by the second pixel value difference calculator 160.

Referring to Equations 11 and 12, when the difference D(m,n) input from the second pixel value difference calculator 160 is large, the correlation $W_{corr}(m,n)$ becomes low. When the difference D(m,n) is small, the correlation $W_{corr}(m,n)$ becomes high. In other words, the difference D(m,n) and the correlation $W_{corr}(m,n)$ have a Gaussian function relation. Here, the parameter $\Delta$ serves to determine a Gaussian function range. For example, as the parameter $\Delta$ is large, the Gaussian function range increases in the order of e1, e2, e3, and e4. For example, the Gaussian function range e1, e2, e3, or e4 corresponds to the parameter $\Delta$ of 5, 10, 15, or 20, respectively. In other words, when the difference D(m,n) is fixed, the correlation $W_{corr}(m,n)$ becomes high with an increase in the parameter $\Delta$. As a result, the amplification of a noise component can be reduced by increasing the correlation $W_{corr}(m,n)$.

The high pass component calculator 166 calculates a high pass component using the correlation input from the correlation calculator 164 and the temporal or spatial filtering value input via the input node IN12 and outputs the high pass component via an output node OUT9. The high pass component calculator 166 is a kind of high-pass filter (HPF). Here, since the sum of all coefficients in a filter mask must be zero, a final coefficient of the HPF is calculated as in Equation 12:

$$\sum_{(m,n)\in M'\times N'}\left[W_{corr}(m, n) - \frac{1}{M'\times N'}\sum_{(m,n)\in M'\times N'} W_{corr}(m, n)\right] = 0 \quad (12)$$

In other words, for an M'×N' filter mask, a difference between a mean value of all correlation values and each of the correlation values is calculated so as to have the characteristics of the HPF. Here, the high pass component calculator 166 can calculate the high pass component using Equation 13:

$$y_{HPF}(i, j) = \sum_{(m,n)\in M'\times N'} \left\{\left[W_{corr}(m, n) - \frac{1}{M'\times N'}\sum_{(m,n)\in M'\times N'} W_{corr}(m, n)\right]\times z(m, n)\right\} \quad (13)$$

wherein "$y_{HPF}(i,j)$" denotes the high pass component.

As can be seen in Equation 13, when the difference D(m,n) between the pixel values of the central and neighboring pixels is large, the correlation $W_{corr}(m,n)$ is low. Thus, a result of the subtraction of a mean correlation from the correlation $W_{corr}(m,n)$ has a negative value. In the opposite case, the result of the subtraction of the mean correlation from the correlation $W_{corr}(m,n)$ has a positive value. As a result, the high pass component can be efficiently extracted. When the high pass component is extracted, an increase in the parameter Δ can contribute to enhancing an efficiency of preventing a fine noise component from being amplified in a background region of an image. However, in a case of an edge region having a large difference between pixel values of a central pixel and a neighboring pixel, it is quite probable that the deterioration of image quality, such as overshooting or undershooting, will occur and a fine difference between grayness values of an image becomes smooth due to a large parameter Δ. As a result, an output image is unnaturally generated. Therefore, the parameter determiner 162 of the high pass component extractor 140A determines the parameter Δ depending on the variation range $D_{range}$ of the difference as in Equation 8 above. In other words, the parameter Δ is set to be high in a smooth region in which the variation range $D_{range}$ of the difference is smaller than or equal to the first predetermined threshold value $th_1$, while the parameter Δ is set to be low in an edge region in which the variation range $D_{range}$ of the difference is larger than the first predetermined threshold value $th_1$.

A conventional method of extracting a high pass component using Laplacian- and Gradient-based high frequency component extracting techniques is disclosed in a book entitled "Fundamentals of Digital Image Processing" by Anil K. Jain and published by Prentice-Hall International Edition, 1989, p. 347-357. When the disclosed conventional method is adopted, noise sensitivity is high. Thus, a noise component of an image passing through the noise reduction filter 10 may be highlighted causing deterioration in the quality of the image. To solve such a problem, the sharpness enhancement filter 12, according to aspects of the present invention, determines similarity between pixels using a difference D(m,n) between pixel values of a central pixel and a neighboring pixel as previously described and non-linearly determines a coefficient of a HPF using the similarity.

Meanwhile, the gain determiner 142 of FIG. 10 determines a gain using a variation range of a difference between a pixel value of a central pixel and pixel values of neighboring pixels inside a filter mask and outputs the gain to the second multiplier 144, which multiplies the gain with the extracted high pass component. For the purpose of determining the gain, the gain determiner 142 may receive the variation range of the difference from the high pass component extractor 140, (i.e., from the parameter determiner 162 of the high pass component extractor 140A), or may obtain the variation range of the difference using the temporal or spatial filtering value for the central pixel input via the input node IN10.

Figure 13:
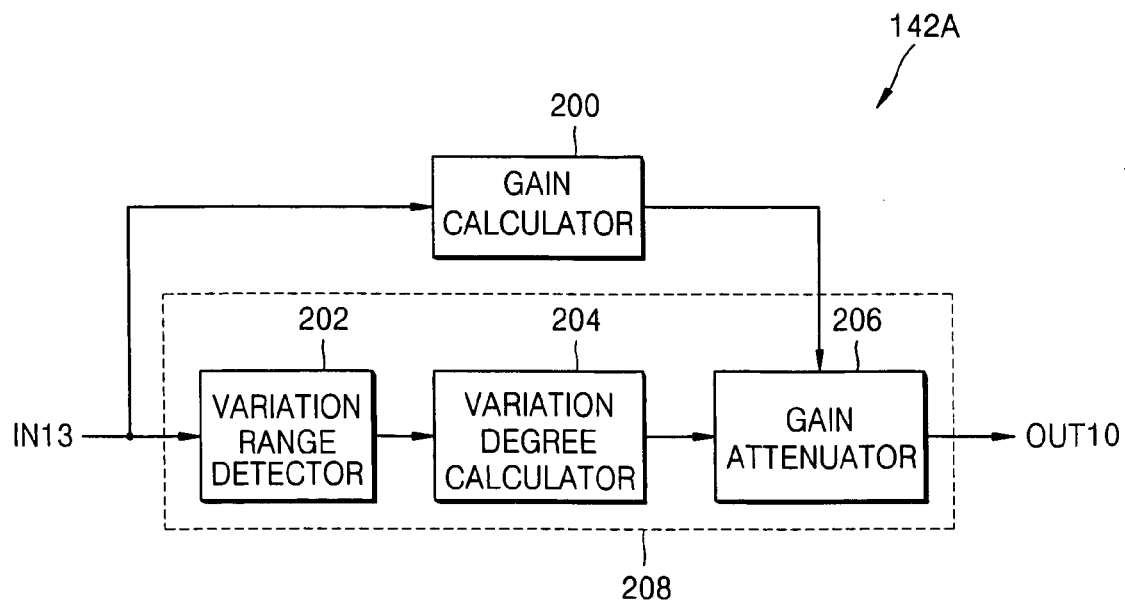
FIG. 13 is a block diagram of an embodiment 142A of the present invention of the gain determiner 142 of FIG. 10.

FIG. 13 is a block diagram of an embodiment 142A of the gain determiner 142 of FIG. 10, including a gain calculator 200 and a gain adjuster 208.

Figure 14:
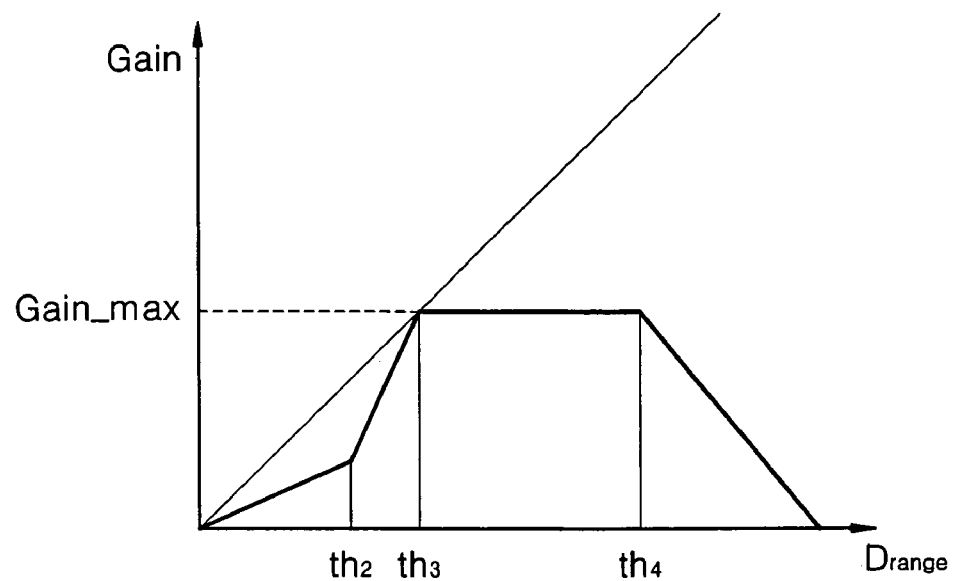
FIG. 14 is an exemplary graph showing the relationship of a gain to a variation range of a difference.

FIG. 14 is an exemplary graph of the present invention for showing the relationship of a gain to the variation range $D_{range}$ of the difference. Here, the horizontal axis denotes the variation range $D_{range}$ of the difference, and the vertical axis denotes the gain.

For example, as shown in FIG. 14, the gain calculator 200 linearly determines a gain. For example, the gain calculator 200 determines the gain to be low so as to prevent a noise component from being amplified in a region in which the variation range $D_{range}$ of the difference is small, determines the gain to be inversely proportional to the variation range $D_{range}$ of the difference so as to prevent overshooting or undershooting from occurring in a region in which the variation range $D_{range}$ of the difference is large, and determines the gain to be high so as to enhance sharpness of an image in a region in which the variation range $D_{range}$ of the difference is median.

For example, the gain calculator 200 can determine the gain using Equation 14:

$$\text{Gain} = \frac{G_{max}\times 0.3\times D_{range}}{th_1}, \text{ if } D_{range} < th_2 \quad (14)$$

$$\text{Gain} = \frac{G_{max}\times 0.7\times (D_{range}-th_2)}{th_2} + 0.3\times G_{max},$$

if $th_2 \le D_{range} < th_3$ $$\text{Gain} = G_{max}, \text{ if } th_3 \le D_{range} < th_4$$

$$\text{Gain} = \frac{-G_{max}\times D_{range}}{th_4} + 2\times G_{max}, \text{ if } th_4 \le D_{range}$$

wherein $th_2$, $th_3$, and $th_4$ denote second, third, and fourth predetermined threshold values, respectively, and $G_{max}$ denotes a maximum value of the gain.

Figure 15:
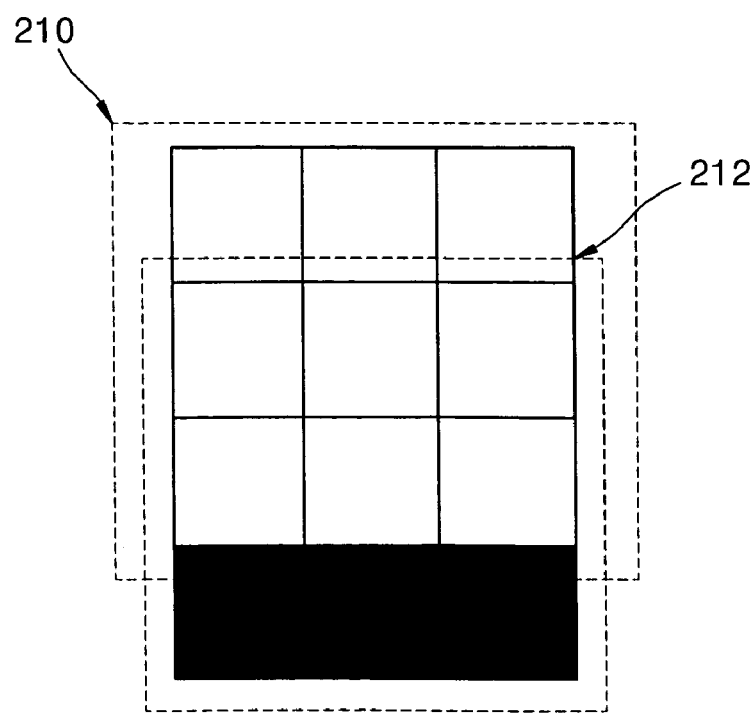
FIG. 15 is an exemplary view explaining the generation of overshooting and undershooting.

FIG. 15 is an exemplary view explaining the generation of overshooting and undershooting, including blocks 210 and 212.

When the gain determiner 142A of FIG. 13 includes only the gain calculator 200, overshooting or undershooting cannot be completely removed. For example, the block 210 of FIG. 15 is classified as a smooth region, and thus a high frequency component is almost close to zero therein. However, a considerably large high frequency component is extracted from the block 212. A human's vision is sensitive to overshooting of the block 212. The gain calculator 200 substantially reduces a high frequency amplification gain for the block 212. However, a significant amount of high frequency component is added to a source image on account of a strong edge component of the block 212, thereby overshooting may occur. Since a gain of a high frequency domain cannot be sharply reduced to obtain the continuity of image quality, the block 212 must be additionally processed. For this purpose, the gain determiner 142A of FIG. 13 may further include the gain adjuster 208 besides the gain calculator 200. Here, the gain adjuster 208 detects variation ranges of differences for all pixels of a block input via an input node IN13, adjusts a gain using the variation ranges of the differences, and outputs the adjusted gain via an output node OUT10. For this purpose, the gain adjuster 208 may include a variation range detector 202, a variation degree calculator 204, and a gain attenuator 206.

Here, the variation range detector 202 detects a variation range of a difference between a pixel value of each of all of the pixels belonging to a block having a neighboring pixel as a central pixel and a pixel value of each of the neighboring pixels.

The variation degree calculator 204 calculates a difference between maximum and minimum values of the variation range of the difference detected by the variation range detector 202 and outputs the difference to the gain attenuator 206.

Figure 16:
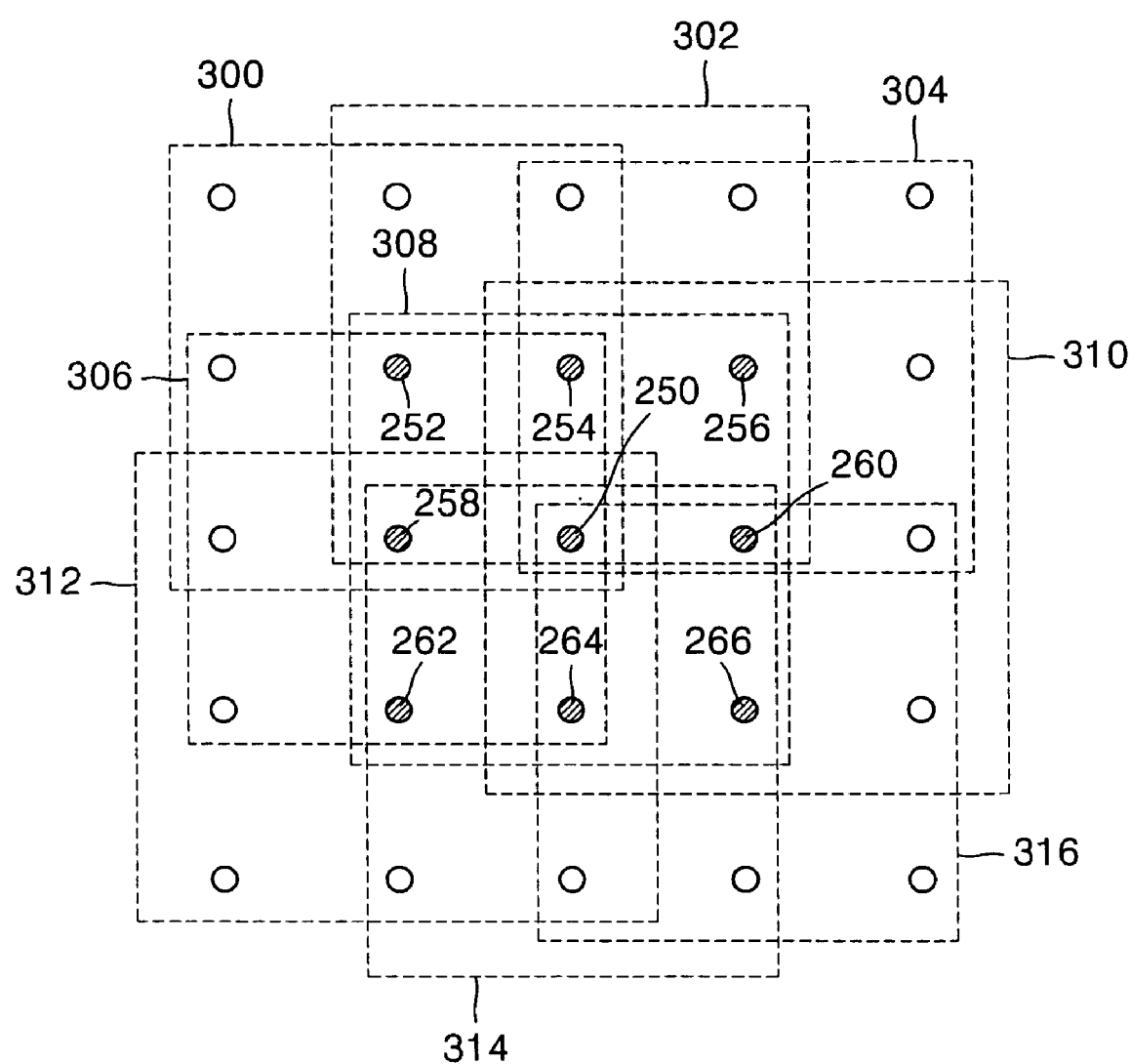
FIG. 16 is an exemplary view to aid the comprehension of a gain adjuster of FIG. 13.

FIG. 16 is an exemplary view to aid in the comprehension of the gain adjuster 208 of FIG. 13, including a central pixel 250 and neighboring pixels 252, 254, 256, 258, 260, 262, 264, and 266 which are marked with striped circles and pixels which are marked with empty circles.

The variation range detector 202 obtains a variation range $D_{range}$s of a difference between a pixel value of each of the pixels belonging to a block 300, 302, 304, 306, 310, 312, 314, or 316, which has a neighboring pixel 252, 254, 256, 258, 260, 262, 264, or 266 as a central pixel, respectively, and a pixel value of the neighboring pixel 252, 254, 256, 258, 260, 262, 264, or 266 using Equation 15. Here, in a case of FIG. 16, $1 \leq s \leq 8$.

$$D_{range}s = \text{MAX}\{Ds(p,q)\} - \text{MIN}\{Ds(p,q)\} \quad (15)$$

wherein, when a block has the size of P×Q, $1 \leq p \leq P$, $1 \leq q \leq Q$, and in the case of FIG. 16, P=Q=3, MIN denotes a minimum value, and Ds(p,q) denotes the difference between the pixel value of each of the pixels belonging to the block 300, 302, 304, 306, 310, 312, 314, or 316, which has the neighboring pixel 252, 254, 256, 258, 260, 262, 264, or 266 as the central pixel, respectively, and the pixel value of the neighboring pixel 252, 254, 256, 258, 260, 262, 264, or 266 and can be represented as in Equation 16:

$$Ds(p,q) = |z(p,q) - z(i,j)| \quad (16)$$

wherein z(p,q) denotes a pixel value of a central pixel, and z(i,j) denotes a pixel value of a neighboring pixel.

Thus, the variation degree calculator 204 calculates a difference $\text{Diff\_D}_{range}$ between maximum and minimum values MAX and MIN of the variation range of the difference and can be represented as in Equation 17:

$$\text{Diff\_D}_{range} = \text{MAX}(D_{range}1, D_{range}2, \ldots, D_{range}8) - \text{MIN}(D_{range}1, D_{range}2, \ldots, D_{range}8) \quad (17)$$

The gain attenuator 206 adjusts the determined gain using the variation range $D_{range}$ of the difference in response to the magnitude of the difference $\text{Diff\_D}_{range}$ calculated by the variation degree calculator 204 and outputs the adjusted gain via the output node OUT10. For example, when the difference $\text{Diff\_D}_{range}$ is equal to or larger than a fifth predetermined threshold value $th_5$, the gain attenuator 206 can adjust the determined gain as in Equation 18:

$$G_{final} = \text{Gain} \times \frac{D_{range}}{2^c} \quad (18)$$

wherein $G_{final}$ denotes the adjusted gain output from the gain attenuator 206, Gain denotes the gain determined by the gain calculator 200, $D_{range}$ denotes the variation range of the difference between the pixel value of each of the pixels 252, 254, 256, 258, 260, 262, 264, and 266 included in the block 308 having the central pixel 250 and the pixel value of the central pixel 250, and c denotes the number of pixels neighboring the central pixel 250. Here, reference numerals of FIG. 16 are used to aid in the comprehension of Equation 18, but Equation 18 is not limited to FIG. 16.

The second multiplier 144 multiplies the gain determined by the gain determiner 142 by the high pass component extracted by the high pass component extractor 140 and outputs the multiplication result to the synthesizer 146. The synthesizer 146 synthesizes the multiplication result of the second multiplier 144 and an image input via an input node IN11, i.e., the temporal or spatial filtering value, and outputs the synthesis result as a sharpened result via an output node OUT7.

FIGS. 17A and 17B are views illustrating exemplary outputs of the present invention and the conventional method. FIG. 17A exemplarily shows an image filtered using a conventional digital image signal filtering apparatus and method, and FIG. 17B exemplarily shows an image filtered using a digital image signal filtering apparatus and method according to an embodiment of the present invention.

As shown in FIG. 17A, when a pixel value is only temporally filtered, a ghost tail 400 occurs, which deteriorates the quality of the image. However, as shown in FIG. 17B, when one of the results, which are obtained by temporally and spatially filtering the pixel value, is selected and enhanced, a ghost tail disappears in a region 402 in which the ghost tail 400 has occurred.

As described above, in an apparatus and method of filtering a digital image signal, according to embodiments of the present invention, the noise reduction filter 10 can be used to adaptively adopt 2-dimensional spatial filtering and 1-dimensional temporal filtering according to the characteristics of an image signal. Thus, oversmoothing and motion blurring can be prevented from occurring at the edge of an image so as to solve a ghost tail problem. Also, noise level estimation can be performed to efficiently reduce noise without deteriorating the quality of the image even when a noise level is high. Moreover, a high pass component can be extracted adaptively to the characteristics of a temporal or spatial filtering value so as not to excessively amplify a remaining noise component and so as to enhance sharpness of the image. As a result, the digital image signal can be filtered at a low cost and at a low operation complexity.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus filtering a digital image signal, comprising:
    a noise reduction filter which selectively outputs one of results obtained by temporally and spatially filtering pixel values of pixels of each frame of an image as a temporal or spatial filtering value in response to magnitudes of the results of the temporal and spatial filtering; and a sharpness enhancement filter which highlights and outputs a high pass component of the selected temporal or spatial filtering value, wherein the noise reduction filter comprises
a temporal filter which temporally filters the pixel values;
a spatial filter which spatially filters the pixel values; and
a filter selector which selectively outputs one of the results of the temporal and spatial filtering as the respective temporal or spatial filtering value in response to a result of a comparison between a local spatial mean value and each of the results of the temporal and spatial filtering, wherein the filter selector selects the temporal or spatial filtering value according to an Equation $$\hat{f}_s(\vec{x}, t) = \begin{cases} \hat{f}(\vec{x}, t), & \text{if } |f_\sigma(\vec{x}, t) - \overline{f}(\vec{x}, t)| > |\hat{f}(\hat{x}; t) - \overline{f}(\vec{x}, t)| \\ f_\sigma(\vec{x}, t), & \text{else} \end{cases}$$

where "$\hat{f}_s(\vec{x},t)$" denotes the temporal or spatial filtering value, "$\hat{f}(\vec{x},t)$" denotes the results of temporal filtering of the pixel values, "$f_{94}(\vec{x},t)$" denotes the results of spatial filtering of the pixel values, and "$\overline{f}(\vec{x},t)$" denotes the local spatial mean value.

2. An apparatus filtering a digital image signal, comprising:
a noise reduction filter which selectively outputs one of results obtained by temporally and spatially filtering pixel values of pixels of each frame of an image as a temporal or spatial filtering value in response to magnitudes of the results of the temporal and spatial filtering; and
a sharpness enhancement filter which highlights and outputs a high pass component of the selected temporal or spatial filtering value,
wherein the noise reduction filter comprises
a temporal filter which temporally filters the pixel values;
a spatial filter which spatially filters the pixel values; and
a filter selector which selectively outputs one of the results of the temporal and spatial filtering as the respective temporal or spatial filtering value in response to a result of a comparison between a local spatial mean value and each of the results of the temporal and spatial filtering
wherein the temporal filter comprises
a pixel value controller which compares a result of a subtraction of a pixel value of a previous frame from a pixel value of a current frame with a motion detection threshold value and outputs the comparison result as a pixel value control signal;
a pixel value operator which generates a new pixel value using the pixel values of the previous and current frames; and
a pixel value selector which selectively outputs the pixel value of the current frame or the new pixel value in response to the pixel value control signal.

3. The apparatus of claim 2, wherein the pixel value operator determines a mean of the pixel values of the previous and current frames as the new pixel value.

4. An apparatus filtering a digital image signal, comprising:
a noise reduction filter which selectively outputs one of results obtained by temporally and spatially filtering pixel values of pixels of each frame of an image as a temporal or spatial filtering value in response to magnitudes of the results of the temporal and spatial filtering; and
a sharpness enhancement filter which highlights and outputs a high pass component of the selected temporal or spatial filtering value,
wherein the noise reduction filter comprises
a temporal filter which temporally filters the pixel values;
a spatial filter which spatially filters the pixel values; and
a filter selector which selectively outputs one of the results of the temporal and spatial filtering as the respective temporal or spatial filtering value in response to a result of a comparison between a local spatial mean value and each of the results of the temporal and spatial filtering
wherein the temporal filter comprises
a pixel value controller which compares a result of a subtraction of a temporal or spatial filtering value of a previous frame from a pixel value of a current frame with a motion detection threshold value and outputs the comparison result as a pixel value control signal;
a pixel value operator which adds a weight on the pixel value of the current frame and the temporal or spatial filtering value of the previous frame to generate at least one new pixel value; and
a pixel value selector which selectively outputs the pixel value of the current frame or the at least one new pixel value in response to the pixel value control signal.

5. An apparatus filtering a digital image signal, comprising:
a noise reduction filter which selectively outputs one of results obtained by temporally and spatially filtering pixel values of pixels of each frame of an image as a temporal or spatial filtering value in response to magnitudes of the results of the temporal and spatial filtering; and
a sharpness enhancement filter which highlights and outputs a high pass component of the selected temporal or spatial filtering value,
wherein the noise reduction filter comprises
a temporal filter which temporally filters the pixel values;
a spatial filter which spatially filters the pixel values; and
a filter selector which selectively outputs one of the results of the temporal and spatial filtering as the respective temporal or spatial filtering value in response to a result of a comparison between a local spatial mean value and each of the results of the temporal and spatial filtering
wherein the temporal filter temporally filters the pixel values according to an Equation $$\hat{f}(\vec{x}, t) = \begin{cases} \dfrac{f(\vec{x}, t) + 2 \times \hat{f}_s(\vec{x}, t-1)}{3}, & \text{if } |f(\vec{x}, t) - \hat{f}_s(\vec{x}, t-1)| \le \dfrac{d}{2} \\ \dfrac{2 \times f(\vec{x}, t) + \hat{f}_s(\vec{x}, t-1)}{3}, & \text{if } \dfrac{d}{2} < |f(\vec{x}, t) - \hat{f}_s(\vec{x}, t-1)| \le d \\ f(\vec{x}, t), & \text{else} \end{cases}$$

where, "$\bar{f}(\vec{x},t)$" denotes the results of temporal filtering of the pixel values, "$f(\vec{x},t)$" denotes the pixel value of a current frame, "$f_s(\vec{x},t-1)$" denotes the temporal or spatial filtering value of a previous frame, and d denotes a motion detection threshold value.

6. An apparatus filtering a digital image signal, comprising:
a noise reduction filter which selectively outputs one of results obtained by temporally and spatially filtering pixel values of pixels of each frame of an image as a temporal or spatial filtering value in response to magnitudes of the results of the temporal and spatial filtering; and
a sharpness enhancement filter which highlights and outputs a high pass component of the selected temporal or spatial filtering value,
wherein the noise reduction filter comprises
a temporal filter which temporally filters the pixel values;
a spatial filter which spatially filters the pixel values; and
a filter selector which selectively outPuts one of the results of the temporal and spatial filtering as the respective temporal or spatial filtering value in response to a result of a comparison between a local spatial mean value and each of the results of the temporal and spatial filtering,
wherein the spatial filter comprises
a line delayer which receives the temporal or spatial filtering value generated for each neighboring pixel belonging to a previous line inside a window mask of predetermined size having a central pixel to delay the received temporal or spatial filtering value by a unit line; and
a first multiplier which multiplies pixel values of the neighboring pixels belonging to the previous line input from the line delayer among pixels inside the window mask or pixel values of neighboring pixels belonging to a subsequent line input from an external source among pixels inside the window mask by corresponding weights, accumulates the multiplication results, and outputs the accumulation result as the result of spatial filtering of a pixel value of the central pixel,
wherein the neighboring pixel neighbors the central pixel, and the previous and subsequent lines are respectively located before and after a current line to which the central pixel belongs.

7. The apparatus of claim 6, wherein the spatial filter comprises:
a subtracter which subtracts the pixel value of the neighboring pixel from the pixel value of the central pixel;
a reference value generator which generates a reference weight value using a noise variance value predicted from the pixel value of the central pixel;
a comparator which compares the subtraction result of the subtracter with the reference weight value; and
a lookup table which receives the comparison result of the comparator as an address, stores the weights as data, and outputs data corresponding to the address to the first multiplier.

8. The apparatus of claim 7, wherein the reference value generator comprises:
a variance value predictor which predicts the noise variance value from the pixel value of the central pixel;
a frame delayer which delays the predicted noise variance value by a unit frame; and
an operator which generates the reference weight value using the delayed predicted noise variance value.

9. The apparatus of claim 8, wherein the operator generates the reference weight value according to an Equation:

$$\sigma = \frac{\sigma_{in}}{10} \times N_{var} + 0.5$$

wherein $\sigma$ denotes the reference weight value, $\sigma_{in}$ denotes a predetermined initial value, and $N_{var}$ denotes the delayed and predicted noise variance value.

10. The apparatus of claim 8, wherein the variance value predictor comprises:
a first pixel value difference calculator which calculates a difference between a pixel value of each pixel inside the window mask and a median pixel value;
a mean value calculator which calculates a mean value of the differences calculated by the first pixel value difference calculator; and
a maximum histogram detector which predicts the mean value having a maximum histogram as the noise variance value.

11. An apparatus filtering a digital image signal, comprising
a noise reduction filter which selectively outputs one of results obtained by temporally and spatially filtering pixel values of pixels of each frame of an image as a temporal or spatial filtering value in response to magnitudes of the results of the temporal and spatial filtering: and
a sharpness enhancement filter which highlights and outputs a high pass component of the selected temporal or spatial filtering value
wherein the sharpness enhancement filter comprises
a high pass component extractor which extracts a high pass component of the temporal or spatial filtering value for a central pixel;
a gain determiner which determines a gain using a variation range of a difference between a pixel value of the central pixel and a pixel value of each neighboring pixel of the central pixel inside a filter mask;
a second multiplier which multiplies the determined gain by the extracted high pass component; and
a synthesizer which synthesizes the multiplication result of the second multiplier and the image and outputs the synthesis result as a sharpened result,
wherein the neighboring pixels neighbor the central pixel, and
the gain determiner determines the gain according to an Equation $$\text{Gain} = \frac{G_{max} \times 0.3 \times D_{range}}{th_1}, \text{ if } D_{range} < th_2$$

$$\text{Gain} = \frac{G_{max} \times 0.7 \times (D_{range} - th_2)}{th_2} + 0.3 \times G_{max},$$

if $th_2 \leq D_{range} < th_3$ $$\text{Gain} = G_{max}, \text{ if } th_3 \leq D_{range} < th_4$$

$$\text{Gain} = \frac{-G_{max} \times D_{range}}{th_4} + 2 \times G_{max}, \text{ if } th_4 \leq D_{range}$$

where $th_2$, $th_3$, and $th_4$ denote second, third, and fourth predetermined threshold values, respectively, $D_{range}$ denotes the variation range of the difference, Gain denotes the gain, and $G_{max}$ denotes a maximum value of the gain.

12. The apparatus of claim 11, wherein the gain determiner comprises a gain calculator which determines the gain to be low in a region in which the variation range of the difference is small, determines the gain to be inversely proportional to the variation range of the difference in a region in which the variation range of the difference is large, or determines the gain to be high in a region in which the variation range of the difference is median.

13. An apparatus filtering a digital image signal, comprising:
   a noise reduction filter which selectively outputs one of results obtained by temporally and spatially filtering pixel values of pixels of each frame of an image as a temporal or spatial filtering value in response to magnitudes of the results of the temporal and spatial filtering: and
   a sharpness enhancement filter which highlights and outputs a high pass component of the selected temporal or spatial filtering value,
   wherein the sharpness enhancement filter comprises
      a high pass component extractor which extracts a high pass component of the temporal or spatial filtering value for a central pixel;
      a gain determiner which determines a gain using a variation range of a difference between a pixel value of the central pixel and a pixel value of each neighboring pixel of the central pixel inside a filter mask;
      a second multiplier which multiplies the determined gain by the extracted high pass component; and
      a synthesizer which synthesizes the multiplication result of the second multiplier and the image and outputs the synthesis result as a sharpened result,
   wherein the neighboring pixels neighbor the central pixel, and
   the high pass component extractor comprises
      a second pixel value difference calculator which calculates a pixel difference between the pixel value of the central pixel and the pixel value of each of the neighboring pixels;
      a parameter determiner which determines a parameter corresponding to a variation range of the difference calculated by the second pixel value difference calculator;
      a correlation calculator which calculates a correlation between the central pixel and the neighboring pixels using the parameter and the pixel difference; and
      a high pass component calculator which calculates the high pass component using the correlation and the temporal or spatial filtering value.

14. The apparatus of claim 13, wherein the parameter determiner determines the parameter according to an Equation:

$$\Delta = \begin{cases} \text{High}, & \text{if } D_{range} \leq th_1 \\ \text{Low}, & \text{if } D_{range} > th_1 \end{cases}$$

wherein $\Delta$ denotes the parameter, $th_1$ denotes a first predetermined threshold value, and $D_{range}$ denotes the variation range of the difference which is determined according to an Equation:

$$D_{range} = \text{MAX}\{D(m,n)\} - \text{MIN}\{D(m,n)\}$$

wherein $D(m,n)$ denotes the pixel difference calculated by the second pixel value difference calculator which is calculated according to an Equation:

$$D(m,n) = |z(m,n) - z(i,j)|$$

wherein, when the filter mask has a size of M×N, $1 \leq m \leq M$ and $1 \leq n \leq N$, $z(m,n)$ denotes the pixel value of the central pixel, and $z(i,j)$ denotes the pixel value of the neighboring pixel.

15. The apparatus of claim 13, wherein the correlation calculator calculates the correlation according to Equations:

$$D(m,n) = |z(m,n) - z(i,j)| \text{ and } W_{corr}(m,n) = \exp\left(-\frac{D(m,n)^2}{\Delta^2}\right)$$

wherein $D(m,n)$ denotes the pixel difference calculated by the second pixel value difference calculator, when the filter mask has a size of M×N, $1 \leq m \leq M$ and $1 \leq n \leq N$, $z(m,n)$ denotes the pixel value of the central pixel, $z(i,j)$ denotes the pixel value of the neighboring pixel, $\Delta$ denotes the parameter, and $W_{corr}(m,n)$ denotes the correlation.

16. The apparatus of claim 15, wherein the high pass component calculator calculates the high pass component according to an Equation:

$$\gamma_{HPF}(i,j) = \sum_{(m,n) \in M \times N} \left\{ \left[ W_{corr}(m,n) - \frac{1}{M \times N} \sum_{(m,n) \in M \times N} W_{corr}(m,n) \right] \times z(m,n) \right\}$$

wherein "$Y_{HPF}(i,j)$" denotes the high pass component.

17. An apparatus filtering a digital image signal, comprising:
   a noise reduction filter which selectively outPuts one of results obtained by temporally and spatially filtering pixel values of pixels of each frame of an image as a temporal or spatial filtering value in response to magnitudes of the results of the temporal and spatial filtering: and
   a sharpness enhancement filter which highlights and outputs a high pass component of the selected temporal or spatial filtering value,
   wherein the sharpness enhancement filter comprises
      a high pass component extractor which extracts a high pass component of the temporal or spatial filtering value for a central pixel;
      a gain determiner which determines a gain using a variation range of a difference between a pixel value of the central pixel and a pixel value of each neighboring pixel of the central pixel inside a filter mask;
      a second multiplier which multiplies the determined gain by the extracted high pass component; and
      a synthesizer which synthesizes the multiplication result of the second multiplier and the image and outputs the synthesis result as a sharpened result,
   wherein the neighboring pixels neighbor the central pixel,
   the gain determiner comprises a gain adjuster which detects variation ranges of differences for all pixels belonging to a block having one of the neighboring pixels as a central pixel and adjusts the gain using the detected variation ranges of the differences, and the gain adjuster comprises
- a variation range detector which detects the variation range of the difference between the pixel value of each of the pixels belonging to the block and the pixel value of each of the neighboring pixels;
- a variation degree calculator which calculates a difference between maximum and minimum values of the variation range of the difference detected by the variation range detector; and
- a gain attenuator which adjusts the determined gain using the variation range of the difference in response to a magnitude of the difference calculated by the variation degree calculator.

18. An apparatus filtering a digital image signal, comprising:
- a noise reduction filter which selectively outputs one of results obtained by temporally and spatially filtering pixel values of pixels of each frame of an image as a temporal or spatial filtering value in response to magnitudes of the results of the temporal and spatial filtering; and
- a sharpness enhancement filter which highlights and outputs a high pass component of the selected temporal or spatial filtering value, wherein the sharpness enhancement filter comprises
- a high pass component extractor which extracts a high pass component of the temporal or spatial filtering value for a central pixel;
- a gain determiner which determines a gain using a variation range of a difference between a pixel value of the central pixel and a pixel value of each neighboring pixel of the central pixel inside a filter mask;
- a second multiplier which multiplies the determined gain by the extracted high pass component; and
- a synthesizer which synthesizes the multiplication result of the second multiplier and the image and outputs the synthesis result as a sharpened result, wherein the neighboring pixels neighbor the central pixel, the gain determiner comprises a gain adjuster which detects variation ranges of differences for all pixels belonging to a block having one of the neighboring pixels as a central pixel and adjusts the gain using the detected variation ranges of the differences and when the difference calculated by the variation degree calculator is equal to or larger than a fifth predetermined threshold value, the gain attenuator adjusts the determined gain according to an Equation $$G_{final} = \text{Gain} \times \frac{D_{range}}{2^c}$$

where $G_{final}$ denotes the adjusted gain output from the gain attenuator, Gain denotes the determined gain, $D_{range}$ denotes the variation range of the difference, and c denotes a number of the neighboring pixels.

* * * * *

UNITED STATES PATENT AND TRADEMARK OFFICE
CERTIFICATE OF CORRECTION

PATENT NO.         : 7,538,822 B2                                                                 Page 1 of 2
APPLICATION NO. : 11/046696
DATED              : May 26, 2009
INVENTOR(S)       : Hoyoung Lee et al.

It is certified that error appears in the above-identified patent and that said Letters Patent is hereby corrected as shown below:

Column 15, Line 22, change " $|\hat{f}(\hat{x};t)$ " to -- $|\hat{f}(\hat{x},t)$ --.

Column 15, Line 29, change " $f_{94}(\overset{\rho}{x},t)$ " to -- $f_{\sigma}(\overset{\rho}{x},t)$ --.

Column 15, Line 37, change "filtering:" to --filtering;--.

Column 15, Line 51, change "filtering:" to --filtering,--.

Column 16, Line 6, change "filtering:" to --filtering;--.

Column 16, Line 20, change "filtering" to --filtering,--.

Column 16, Line 55, change "filtering" to --filtering,--.

Column 17, Line 1, change "where," to --where--.

Column 17, Line 20, change "outPuts" to --outputs--.

Column 18, Lines 24-25, change "comprising" to --comprising:--.

Column 18, Line 30, change "filtering:" to --filtering;--.

Column 18, Line 34, change "value" to --value,--.

Column 19, Line 18, change "filtering:" to --filtering;--.

Signed and Sealed this

Twenty-ninth Day of June, 2010

David J. Kappos
*Director of the United States Patent and Trademark Office*

CERTIFICATE OF CORRECTION (continued)
U.S. Pat. No. 7,538,822 B2

Column 20, Line 32, change "$\gamma_{HPF}(i, j)$" to --$y_{HPF}(i, j)$--.

Column 20, Line 37, change ""$Y_{HPF}(i,j)$"" to --"$y_{HPF}(i,j)$"--.

Column 20, Line 40, change "outPuts" to --outputs--.

Column 20, Line 44, change "filtering:" to --filtering;--.

Column 21, Line 22, change "filtering:" to --filtering;--.

Column 22, Line 16, change "differences" to --differences,--.